(12) United States Patent
Sano

(10) Patent No.: US 11,729,361 B2
(45) Date of Patent: Aug. 15, 2023

(54) PROJECTION APPARATUS

(71) Applicant: CANON KABUSHIKI KAISHA, Tokyo (JP)

(72) Inventor: Akira Sano, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 175 days.

(21) Appl. No.: 17/210,288

(22) Filed: Mar. 23, 2021

(65) Prior Publication Data

US 2021/0314539 A1 Oct. 7, 2021

(30) Foreign Application Priority Data

Apr. 1, 2020 (JP) .................... 2020-065890

(51) Int. Cl.
*H04N 9/31* (2006.01)
*G03B 21/14* (2006.01)
(52) U.S. Cl.
CPC ......... *H04N 9/3185* (2013.01); *G03B 21/142* (2013.01); *H04N 9/3188* (2013.01)
(58) Field of Classification Search
CPC .... G03B 21/006; G03B 21/008; G03B 21/28; G03B 21/208; G03B 21/142; G03B 21/147; G03B 21/2053; H04N 9/315; H04N 9/3185; H04N 9/3188; H04N 9/3191; H04N 9/3194
See application file for complete search history.

(56) References Cited

U.S. PATENT DOCUMENTS

| | | | | |
|---|---|---|---|---|
| 2017/0061894 A1* | 3/2017 | Ikeda | .................... | G09G 5/003 |
| 2019/0199929 A1* | 6/2019 | Sekine | .................. | H04N 5/353 |
| 2020/0082529 A1* | 3/2020 | Mikami | ............... | H04N 13/361 |
| 2020/0273205 A1* | 8/2020 | Yamashita | ........... | H04N 17/002 |
| 2020/0358992 A1* | 11/2020 | Ishii | ........................ | G06T 3/005 |

FOREIGN PATENT DOCUMENTS

JP 2015192389 A 11/2015

\* cited by examiner

*Primary Examiner* — Sultan Chowdhury
(74) *Attorney, Agent, or Firm* — Canon U.S.A., Inc. IP Division

(57) ABSTRACT

An apparatus includes an acquisition unit configured to acquire a characteristic value of each of partial regions of an input image; a determination unit configured to determine target regions for which a graphic is displayed, out of the partial regions, based on the acquired characteristic values and a predetermined condition; and a control unit configured to control so that the graphic is displayed in the target regions of the input image.

20 Claims, 9 Drawing Sheets

PROJECTION APPARATUS

BACKGROUND

Field of the Invention

The aspect of the embodiments relates to a projection apparatus.

Description of the Related Art

In an amusement facility, museum, or the like, a projection system using one or more projection apparatuses may be installed. In some cases, in this projection system, an image of a calibration pattern projected from the projection apparatus (a calibration pattern on a screen) is captured by a camera, and a shape, image quality, and the like of the image on the screen are corrected based on this captured image. Further, in some cases, predetermined information is embedded in an image as a digital watermark to protect copyright, and the digital watermark is detected from the image captured by a camera.

In a case where a graphic, such as a calibration pattern and a digital watermark, is combined with (superimposed on) a projection image (contents) of a projection apparatus, and the graphic is detected from an image captured by a camera, the graphic is to combine such that the display quality of the contents does not drop. In other words, the graphic is to combine such that the user cannot visually recognize (perceive) the graphic.

Japanese Patent Application Publication No. 2015-192389 discloses a technique that does not superimpose a digital watermark on a pixel having a characteristic that the change of the pixel value can be visually recognized easily.

However, according to the technique disclosed in Japanese Patent Application Publication No. 2015-192389, the digital watermark (graphic) may not be superimposed (combined) at all depending on the image to be displayed (projection image: contents). In such a case the digital watermark cannot be detected from the captured image, and copyright of the projection image cannot be protected. In the case where the graphic is a calibration pattern, the shape, image quality, and the like of the projection image cannot be corrected appropriately.

SUMMARY

The first aspect of the embodiments provides an apparatus including at least one processor; and at least one memory coupled to the at least one processor, the memory having instructions that, when executed by the processor, performs function as: an acquisition unit configured to acquire a characteristic value of each of partial regions of an input image; a determination unit configured to determine target regions for which a graphic is displayed, out of the partial regions, based on the acquired characteristic values and a predetermined condition; and a control unit configured to control so that the graphic is displayed in the target regions of the input image.

The second aspect of the embodiments provides a method including: acquiring a characteristic value of each of partial regions of an input image; determining target regions for which a graphic is displayed, out of the partial regions, based on the acquired characteristic values and a predetermined condition; and controlling so that the graphic is displayed in the target regions of the input image.

The third aspect of the embodiments provides a non-transitory computer readable medium that stores a program, wherein the program causes a computer to execute a method including: acquiring a characteristic value of each of partial regions of an input image; determining target regions for which a graphic is displayed, out of the partial regions, based on the acquired characteristic values and a predetermined condition; and controlling so that the graphic is displayed in the target regions of the input image.

Further features of the disclosure will become apparent from the following description of exemplary embodiments with reference to the attached drawings.

DESCRIPTION OF THE EMBODIMENTS

Figure 1:
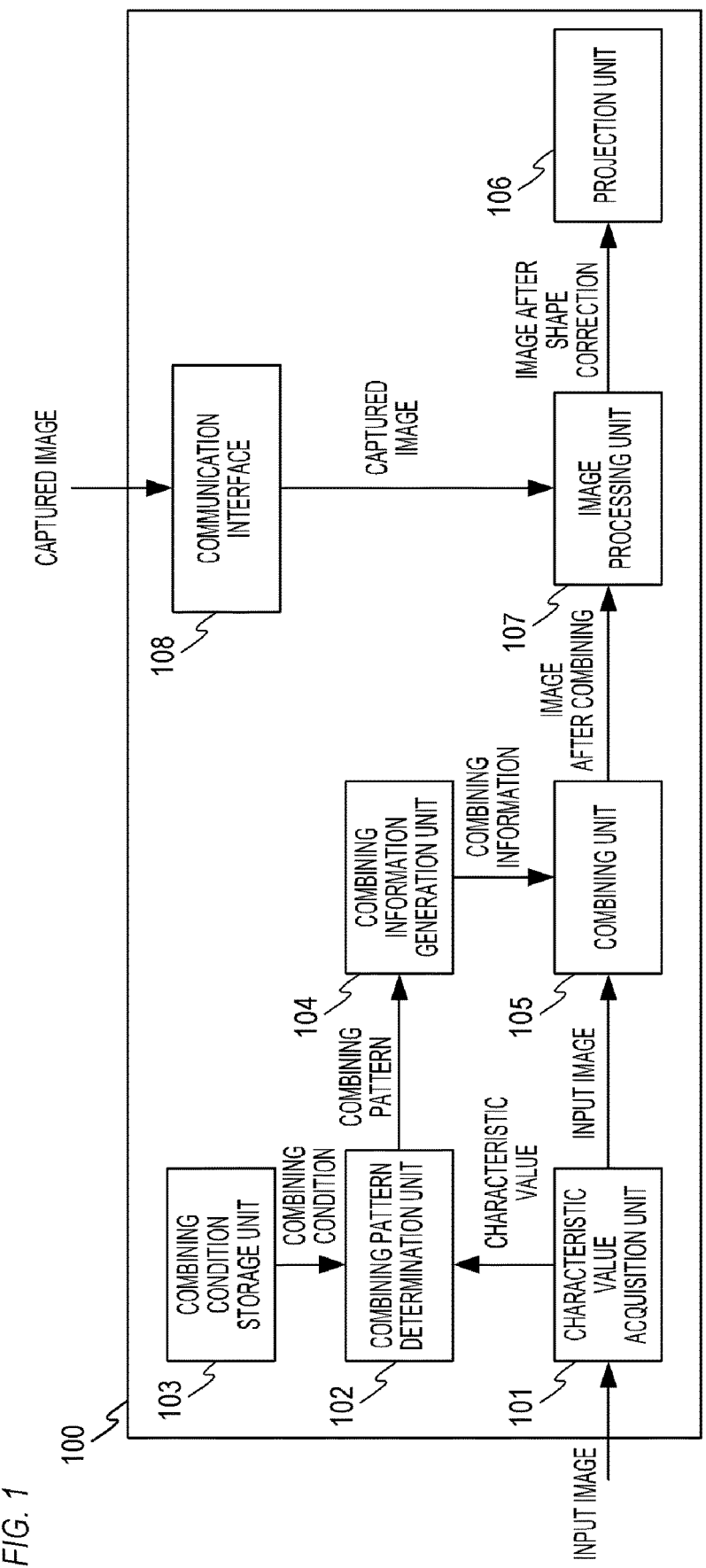
FIG. 1 is a block diagram depicting a configuration example of a projection apparatus.

Embodiments of the disclosure will be described with reference to the drawings. FIG. 1 is a block diagram depicting a configuration example of a projection apparatus according to the present embodiment. The projection apparatus 100 in FIG. 1 includes a characteristic value acquisition unit 101, a combining pattern determination unit 102, a combining condition storage unit 103, a combining information generation unit 104, a combining unit 105 and a projection unit 106. FIG. 1 also includes an image processing unit 107 and a communication interface 108, of which description will be omitted here (The image processing unit 107 and the communication interface 108 will be described at the end of the present description).

The characteristic value acquisition unit 101 acquires (extracts) the characteristic value of each of a plurality of partial regions of an input image (image (image signals) inputted to the projection apparatus 100). The combining pattern determination unit 102 determines a combining pattern based on a plurality of characteristic values acquired by the characteristic value acquisition unit 101 and a predetermined combining condition. The combining condition storage unit 103 is a storage unit to store combining conditions in advance, and the combining pattern determination unit 102 reads out a combining condition from the combining condition storage unit 103. The combining pattern is a combination of a plurality of combining target regions, for which combining information is combined respectively, out of the plurality of partial regions. The combining information generation unit 104 generates combining information (graphic; a plurality of combining information that are combined with a plurality of combining target regions respectively) in accordance with the combining pattern determined by the combining pattern determination unit 102. The combining unit 105 combines (superimposes) the combining information generated by the combining information generation unit 104 on the input image. In one embodiment, the combining information generation unit 104 generates the combining information drawn only for the combining target regions, therefore the combining unit 105 combines (draws) the combining information only on the combining target regions, and does not combine (draw) the combining information on the other regions. The projection unit 106 includes a display panel (e.g. liquid crystal panel), a light source, a projection lens, and the like, and projects the image combined by the combining unit 105 onto a projection surface (screen) which is not illustrated here. Other image processing steps may be executed on the input image before the combining step by the combining unit 105. Further, other image processing steps may be executed on the image after executing the combining step by the combining unit 105. The projection unit 106 can project an image (4K image) of which number of pixels is 3840 in the horizontal direction, and 1920 in the vertical direction. However, the number of pixels that the projection unit 106 can project may be more or less than 4K.

Figure 2:
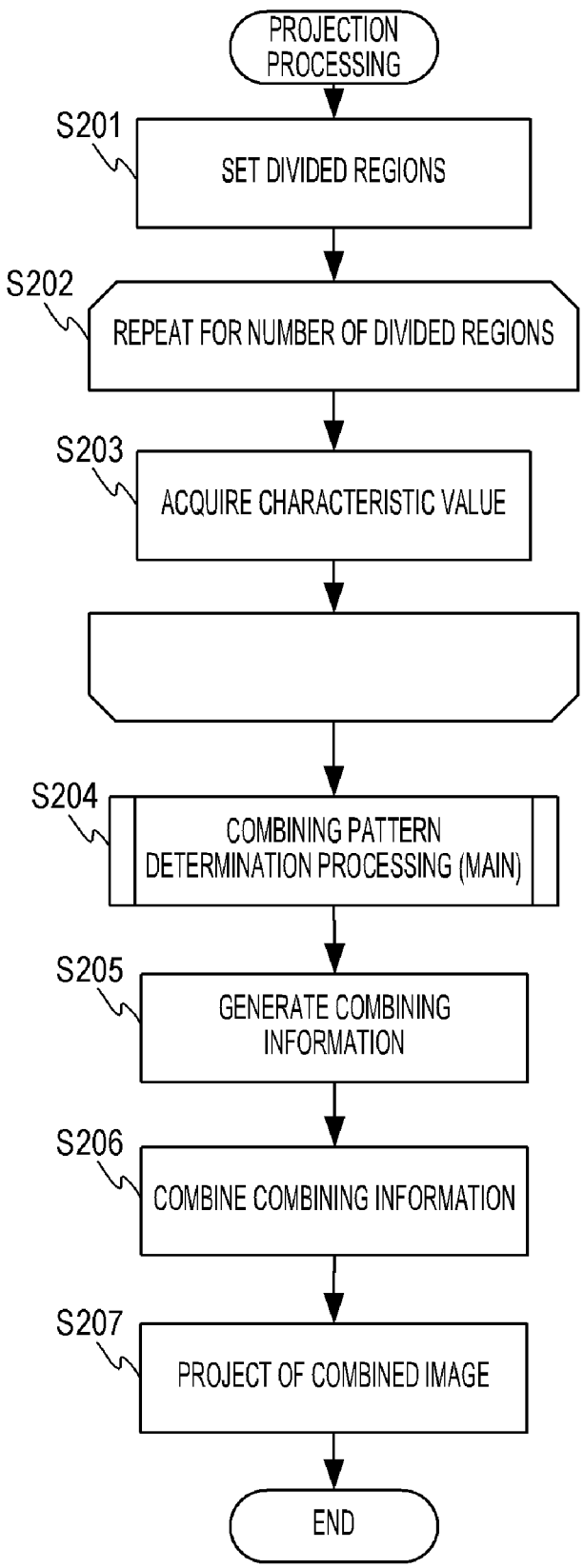
FIG. 2 is a flow chart depicting an example of projection processing.

FIG. 2 is a flow chart depicting an example of the projection processing performed by the projection apparatus 100. FIG. 2 indicates an example of the projection processing that is performed on one frame of the input image. The projection apparatus 100 performs the projection processing in FIG. 2 for each frame. Here the projection apparatus 100 may or may not constantly perform the projection in FIG. 2 during the period when the images are being inputted to the projection apparatus 100. For example, the projection apparatus 100 may start or end the projection processing in FIG. 2 in accordance with the instruction from the user to the projection apparatus 100. Further, the projection apparatus 100 may perform the projection processing in FIG. 2 during a predetermined time from a predetermined timing. The predetermined timing is a timing when the user sends an instruction, or a timing when the motion of the projection apparatus 100 is detected by an acceleration sensor or the like, for example.

Figure 3:
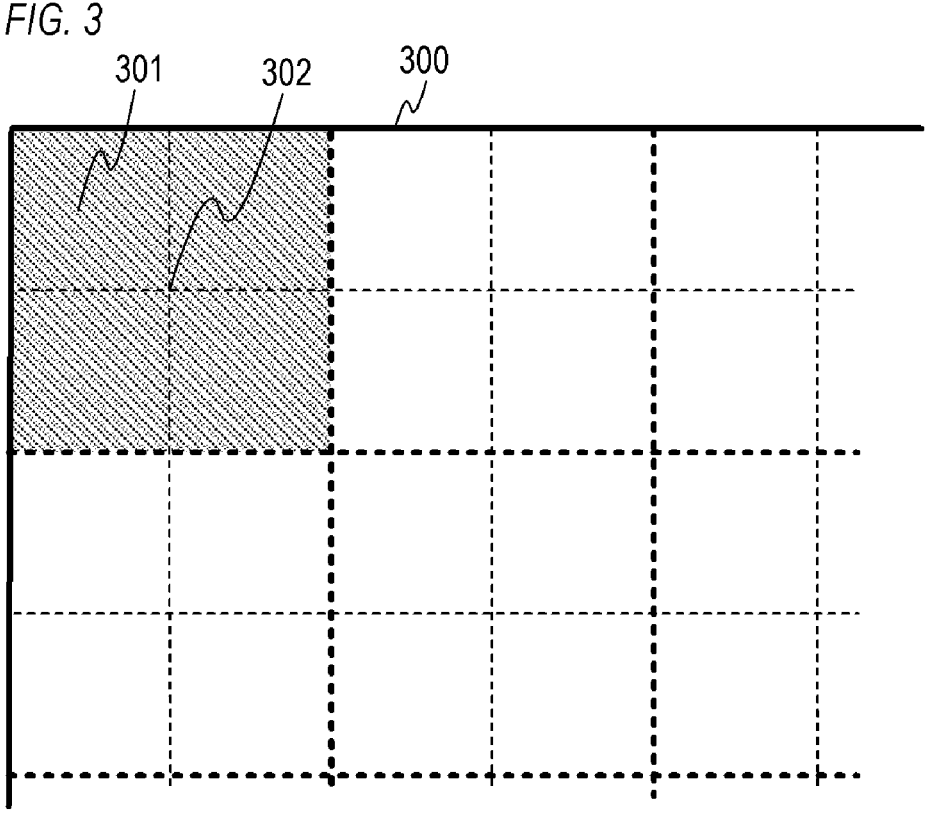
FIG. 3 is a schematic diagram depicting an example of a divided region.

In step S201, the characteristic value acquisition unit 101 sets a plurality of partial regions of the input image. As illustrated in FIG. 3, in the present embodiment, it is assumed that a plurality of divided regions 301 are set (determined) as the plurality of partial regions, by dividing the region 300 (entire region) of the input image. It is also assumed that the size of each divided region (each partial region) is a size predetermined by an algorithm to generate the combining information (size of one combining information; e.g. a number of pixels in horizontal direction×a number of pixels in vertical direction=50×50). The partial region is simply a partial region of the input image, and a plurality of regions which are distant from each other may be set as the plurality of partial regions. The size of the partial region, the algorithm to generate the combining information, and the like, are not especially limited.

In step S202, the characteristic value acquisition unit 101 performs the processing in step S203 for each of the plurality of divided regions which were set in step S201. In step S203, the characteristic value acquisition unit 101 acquires (extracts) the characteristic value of each divided region from the input image.

The characteristic value is a statistic related to the visibility of combining information in the image after the combining information is combined by the combining unit 105 (hereafter simply referred to as "visibility of combining information"), and the magnitude of the characteristic value corresponds to the visibility of the combining information, for example. In the present embodiment, as the characteristic value of each divided region, at least one of a motion amount of the image in this divided region, a spatial brightness change amount in this divided region, and a brightness value of this divided region is acquires such that the visibility of the combining information decreases as the characteristic value increases. The characteristic value, however, is not limited to this, and a type of the characteristic value may be determined such that the visibility increases as the characteristic value increases.

The motion amount of the image can be acquired using an algorithm to estimate the optical flow, for example. The algorithm to estimate the optical flow is not especially limited, but the Lucas-Kanade method, for example, may be used. In the estimation of the optical flow, a pixel, of which correspondence (degree of correlation: similarity) to a target pixel (pixel of interest) is highest, is detected in subsequent frame of the frame of the target pixel, and the vector from the target pixel to the detected pixel is calculated as the motion vector of the target pixel. Then the motion vector is calculated for each pixel of the divided region as the target pixel, and the sum of the calculated motion vectors is calculated as the motion amount of the image in this divided region. For example, the frame of the target pixel is a previous frame of the current frame, and the frame for which a pixel corresponding to the target pixel is detected is the current frame.

Here a case where the pixel of coordinates (position in horizontal direction, position in vertical direction)=(x1, y1) is moved to the coordinates (x2, y2) is considered. In this case, the motion vector $v=(x2-x1, y2-y1)$ can be calculated, and the magnitude of v, that is, $|v|=((x2-x1)^2+(y2-y1)^2)^{1/2}$ can be calculated. If m number of motion vectors v1, v2, v3 . . . vm are calculated for a divided region, the motion amount of the image in this divided region can be calculated using the following Expression 1.

Motion amount of image in a divided region=$|v1|+|v2|+|v3|+ \ldots +|vm|$     (Expression 1).

As the motion amount of the image in a divided region is larger, the temporal change of the pixel values (pixel values of the input image) in this divided region is expected to be larger. Further, in a divided region in which the motion amount of the image is large, the motion of the input image (temporal change of the pixel values of the input image) is more noticeable than in a divided region in which motion amount of the image is smaller, therefore the change of the pixel values caused by combining the combining information is less likely to be visually recognized. In other words, as the motion amount of the image in a divided region is larger, visibility of the combining information in this divided region is lower.

The spatial brightness change amount can be acquired using an algorithm to detect an edge, for example. The algorithm to detect an edge is not especially limited, but the Canny method, for example, can be used. In the edge detection, a portion where the spatial brightness changes discontinuously can be detected as an edge portion. Then the ratio of a number of pixels in the detected edges (density of the edge and brightness step difference), with respect to the total number of pixels of the divided region, can be calculated as the spatial brightness change amount in this divided region.

Here a case where w indicates a number of pixels of a divided region in the horizontal direction (width), h indicates a number of pixels of the divided region in the vertical direction (height), and N indicates a number of pixels of an edge detected from this divided region, will be considered. In this case, the spatial brightness change amount in the divided region can be calculated using the following Expression 2.

Spatial brightness change amount in the divided region=$N/(w \times h)$ (Expression 2).

The edge portion is a portion where change of the spatial brightness is large, and human eyes are sensitive to the changes of the spatial brightness. In a divided region in which the spatial brightness change amount is large, human eyes are more easily attracted to the change of the spatial brightness compared with a divided region in which the spatial brightness change amount is small, hence the change of the pixel values caused by combining the combining information is less likely to be visually recognized. In other words, the visibility of the combining information in a divided region is lower as the spatial brightness change amount in the divided region is larger.

The brightness value of a pixel of an input image can be calculated based on the pixel values (R value, G value and B value) of this pixel using the following Expression 3.

Brightness value=$0.299 \times R$ value+$0.587 \times G$ value+ $0.114 \times B$ value (Expression 3).

Because of the visual characteristics of human eyes, the change of the pixel values caused by combining the combining information is less likely to be visually recognized in a divided region in which the brightness value (e.g. representative value, such as mean brightness value, modal brightness value, median brightness value, maximum brightness value and minimum value) is large, compared with a divided region in which brightness value is small. In other words, the visibility of the combining information in a divided region is lower as the brightness value in the divided region is larger (brighter).

In step S204, the combining pattern determination unit 102 performs combining pattern determination processing (main) to determine a combining pattern based on the plurality of characteristic values acquired in step S203 and the combining conditions which are stored in the combining condition storage unit 103 in advance. The combining pattern determination processing (main) will be described in detail later with reference to FIG. 6.

Figure 4:
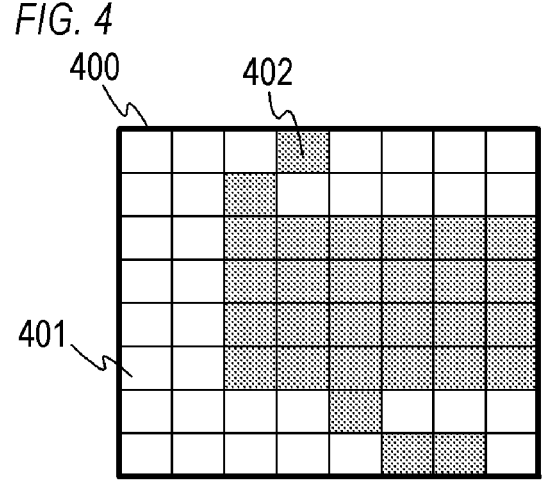
FIG. 4 is a conceptual diagram depicting an example of a combining pattern.

FIG. 4 is a conceptual diagram depicting an example of a combining pattern. A region 400 (entire region) of the input image is constituted of a plurality of divided regions. A divided region 401 is a combining target region where combining information is combined, and a divided region 402 is a non-combining target region where combining information is not combined. For example, for the combining pattern, information, in which each divided region is corresponded to a flag indicating whether combining information is combined or not, is generated. Specifically, for the combining pattern, information, in which the combining target region is indicated by flag=1 and the non-combining target region is indicated by flag=0, is generated.

In step S205, the combining information generation unit 104 generates the combining information (a plurality of combining information which are combined in a plurality of combining target regions respectively) in accordance with the combining pattern determined in step S204. The combining information is a graphic which human eyes cannot easily perceive, such as a pattern image (calibration pattern) generated by encoding two-dimensional coordinates (spatial position) of the corresponding region, and a digital watermark which indicates copyright information on the input image. In the case of combining a pattern image, the pattern image is detected from the image captured by a camera (image on projection surface), and based on this detection result, the shape, image quality, or the like of the image on the projection surface can be corrected. In the case of combining a digital watermark, the digital watermark is detected from the image captured by a camera, whereby the copyright of the input image can be protected.

Figure 5:
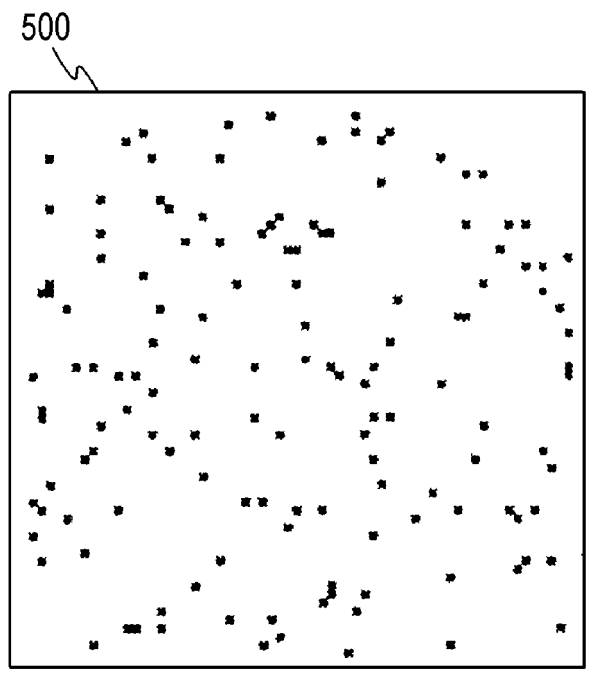
FIG. 5 is a schematic diagram depicting an example of a dot pattern.

Here a case where the combining information is a pattern image generated by encoding two-dimensional coordinates (spatial position) of a corresponding divided region will be considered. For example, in this case, a position 302 in FIG. 3 is encoded, and a dot pattern 500 illustrated in FIG. 5 is generated as a pattern image. The position 302 is the center position of the divided region, but a position to be encoded may be another position in the divided region, and may be a position of a vertex (one of four corners) of the divided region, for example.

If the combining information is generated such that the combining information can be detected at high precision from an image captured by the camera, the visibility of the combining information increases. In other words, improvement of precision of detecting the combining information from an image captured by a camera and decreasing visibility of the combining information are in a trade off relationship. Therefore, the combining information considering this trade off is generated, so that the combining information can be detected at a sufficient precision, and visibility of the combining information can be sufficiently decreased. For example, a dot pattern considering this tradeoff is generated so that each dot has a small size and low color density, and the dots are disposed at low density.

In step S206, the combining unit 105 combines the combining information, which was generated in step S205, with the input image. For example, in one embodiment, the combining information is combined with the input image by adding or subtracting offset values (pixel values of the combining information) to/from the pixel values of the input image. In step S205, the offset value≠0 is set only in each combining target region, hence in step S206, the combining information is combined (drawn) only in the combining target regions, and is not combined (drawn) in other regions (non-combining target regions).

In step S207, the projection unit 106 projects the image after the combining in step S206 onto the projection surface.

Figure 6:
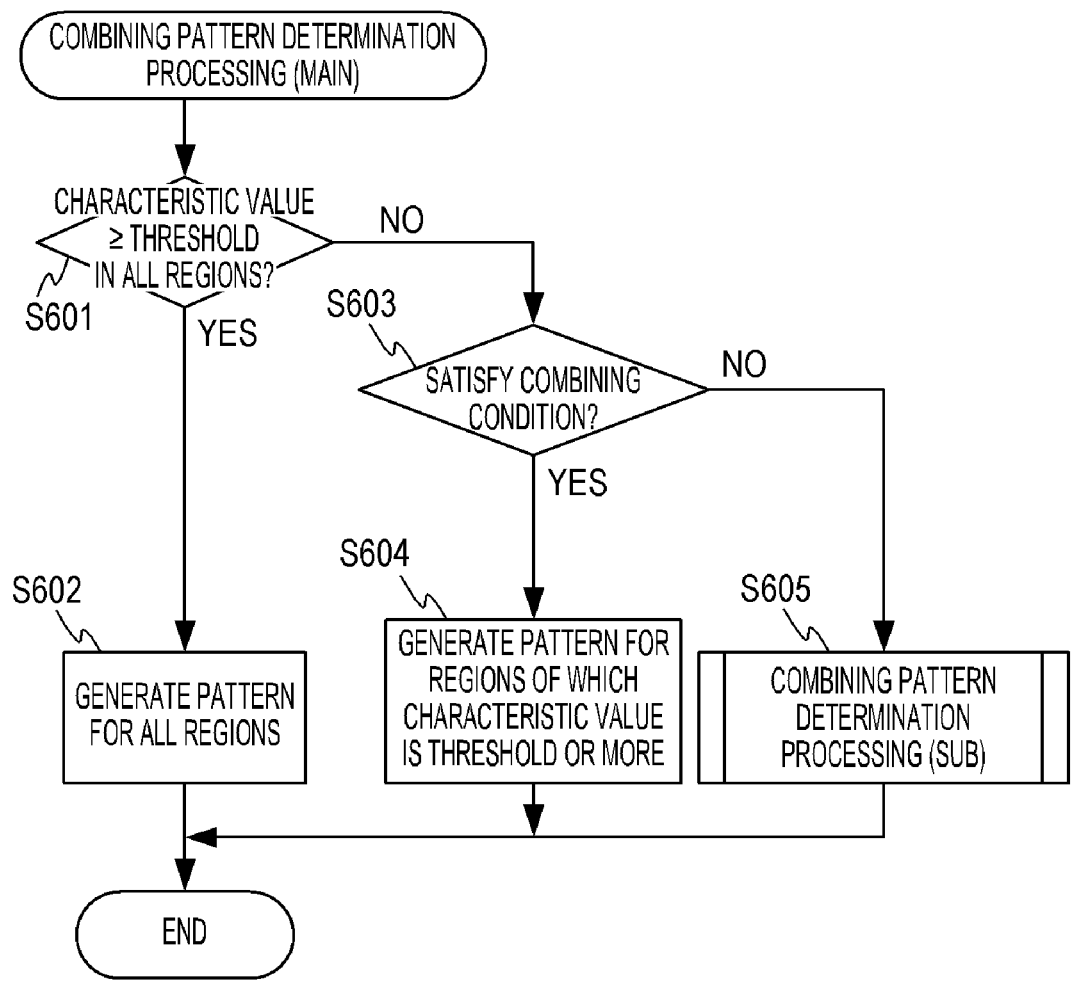
FIG. 6 is a flow chart depicting an example of a combining pattern determination processing (main).

FIG. 6 is a flow chart depicting an example of the combining pattern determination processing (main) which is performed in step S204 in FIG. 2.

In step S601, the combining pattern determination unit 102 determines whether the characteristic value is a threshold T or more in all the divided regions. The characteristic value that is threshold T or more means that the visibility of the combining information is a threshold or less. If the characteristic value is the threshold T or more in all the divided regions, processing advances to step S602. If there is a divided region of which characteristic value is less than the threshold, processing advances to step S603.

In the case where a plurality of different types of characteristic values (e.g. motion amount of image, spatial brightness change amount, brightness value) are acquired as the characteristic values of one divided region, a plurality of thresholds corresponding to the plurality of characteristic values respectively may be provided in advance, so that the plurality of characteristic values are compared with the plurality of thresholds respectively. Further, a plurality of values determined by normalizing the plurality of characteristic values may be compared respectively with one threshold that is common to the plurality of characteristic values. In this case, a divided region, of which a number of (number of types of) characteristic values exceeding a threshold is a threshold number or more (threshold number is 1 or more) may be regarded as a divided region of which characteristic value is the threshold T or more (divided region in which visibility of the combining information is a threshold or less). A representative value (e.g. maximum value, minimum value, mean value, median value, modal value) of a plurality of values, determined by normalizing the plurality of characteristic values respectively, may be compared with a threshold.

In step S602, the combining pattern determination unit 102 determines all the divided regions as the combining target regions, and generates the combining pattern, since the characteristic value becomes the threshold T or more in all the divided regions, that is, the visibility of the combining information becomes a threshold or less in all the divided regions. It should be noted that the processing in steps S601 and S602 may be omitted, and the combining pattern may be generated in the processing steps after step S603, even in the case where the characteristic value is the threshold T or more in all the divided regions.

In step S603, the combining pattern determination unit 102 determines whether the divided region of which characteristic value is the threshold T or more satisfies the combining condition stored in the combining condition storage unit 103 in advance. Processing advances to step S604 if the divided region of which the characteristic value is the threshold T or more satisfies the combining direction, or processing advances to step S605 if the divided region of which characteristic value is the threshold T or more does not satisfy the combining condition.

In order to detect the combining information at high precision (in order to detect coordinates indicated by dot patterns at high precision, for example) from an image captured by a camera, in one embodiment, a number of combining information (combining target regions) is high. Furthermore, in order to perform processing based on the result of detecting the combining information at high precision (in order to perform correction of shape, image quantity and the like of an image on the projection surface at high precision, for example), in one embodiment, a distance (interval) between the combining information (combining target regions) is large. Therefore, the combining condition includes at least one of the following two conditions. The combining conditions may be fixed conditions (e.g. conditions determined by a manufacturer in advance), or conditions that the user sets (changes) in accordance with the installation environment of the projection apparatus 100 and the use.

- A number of the divided regions each of which characteristic value is the threshold T or more (divided regions each of which visibility is a threshold or less) is a threshold number n or more (threshold number n is 2 or more).
- A distance between the divided regions each of which characteristic value is the threshold T or more (divided regions each of which visibility is a threshold or less) is a threshold distance d or more.

Figure 7:
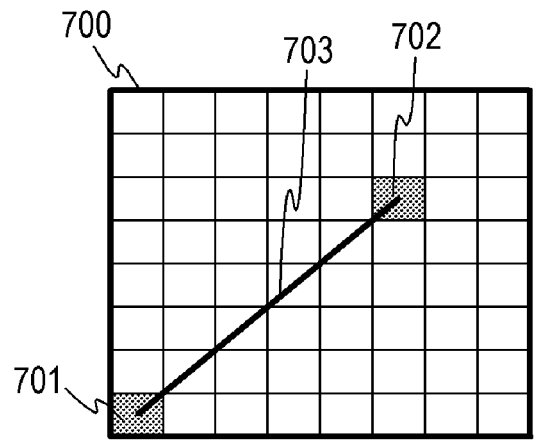
FIG. 7 is a conceptual diagram depicting an example of a distance between divided regions.

FIG. 7 is a conceptual diagram depicting an example of a distance of divided regions. A region 700 (entire region) of an input image is constituted of a plurality of divided regions. A distance 703 between a divided region 701 and a divided region 702 is a distance between the center of the divided region 701 and the center of the divided region 702. The distance between divided regions is not limited to this, and may be the shortest distance between the divided regions or the distance between the predetermined vertexes (e.g. upper right corners). For the distance of divided regions, a distance in the horizontal direction and a distance in the vertical direction may be calculated respectively. In this case, a condition where at least one of the distance in the horizontal direction and the distance in the vertical direction is a threshold distance or more, may be used, or a condition where both the distance in the horizontal direction and the distance in the vertical direction are the threshold distance or more, may be used. The threshold distance, which is compared with the distance in the horizontal direction, may be the same as or different from the threshold distance, which is compared with the distance in the vertical direction.

In step S604, the combining pattern determination unit 102 determines all the divided regions of which characteristic value is the threshold T or more as the combining target regions, and generates the combining pattern. The divided regions of which characteristic value is less than the threshold T are not determined as the combining target regions, but become non-combining target regions.

In step S605, the combining pattern determination unit 102 performs the combining pattern determination processing (sub) to generate (determine) a combining pattern based on the characteristic value of each divided region. The combining pattern determination processing (sub) will be described in detail later with reference to FIG. 8 to FIG. 10.

Figure 8:
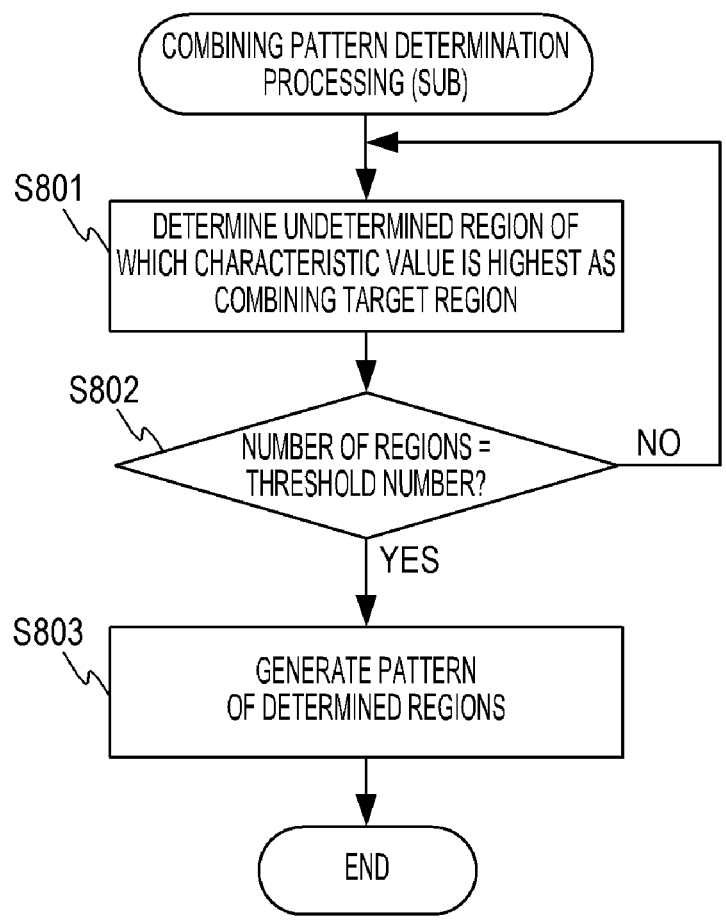
FIG. 8 is a flow chart depicting an example of a combining pattern determination processing (sub).

FIG. 8 is a flow chart depicting an example of the combining pattern determination processing (sub) which is performed in step S605 in FIG. 6. In the combining pattern determination processing (sub) in FIG. 8, a combining pattern is determined based on the characteristic value of each divided region, and not based on the distance of divided regions. Specifically, a threshold number of divided regions are determined as a plurality of combining target regions in order from a divided region having lower visibility, based on the characteristic value of each divided region, and a combining pattern is generated in accordance with the determined plurality of combining target regions.

In step S801, the combining pattern determination unit 102 determines (selects) a divided region of which characteristic value is highest (divided region of which visibility is lowest), as the combining target region, out of a plurality of divided regions which are not yet determined as the combining target region. Hereafter, a divided region which is not yet determined (selected) as a combining target region is referred to as an "undetermined region (unselected region)".

In step S802, the combining pattern determination unit 102 determines whether the number of combining target regions determined in step S801 reached the threshold number. Processing returns to S801 if the number of combining target regions did not reach the threshold number, and processing advances to step S803 if the number of combining target regions reached the threshold number. In one embodiment, the threshold number here is the same as the above mentioned threshold number n that is used for the combining condition, but may be different from the threshold number n.

In step S803, the combining pattern determination unit 102 generates the combining pattern in accordance with all the combining target regions determined in step S801.

Figure 9:
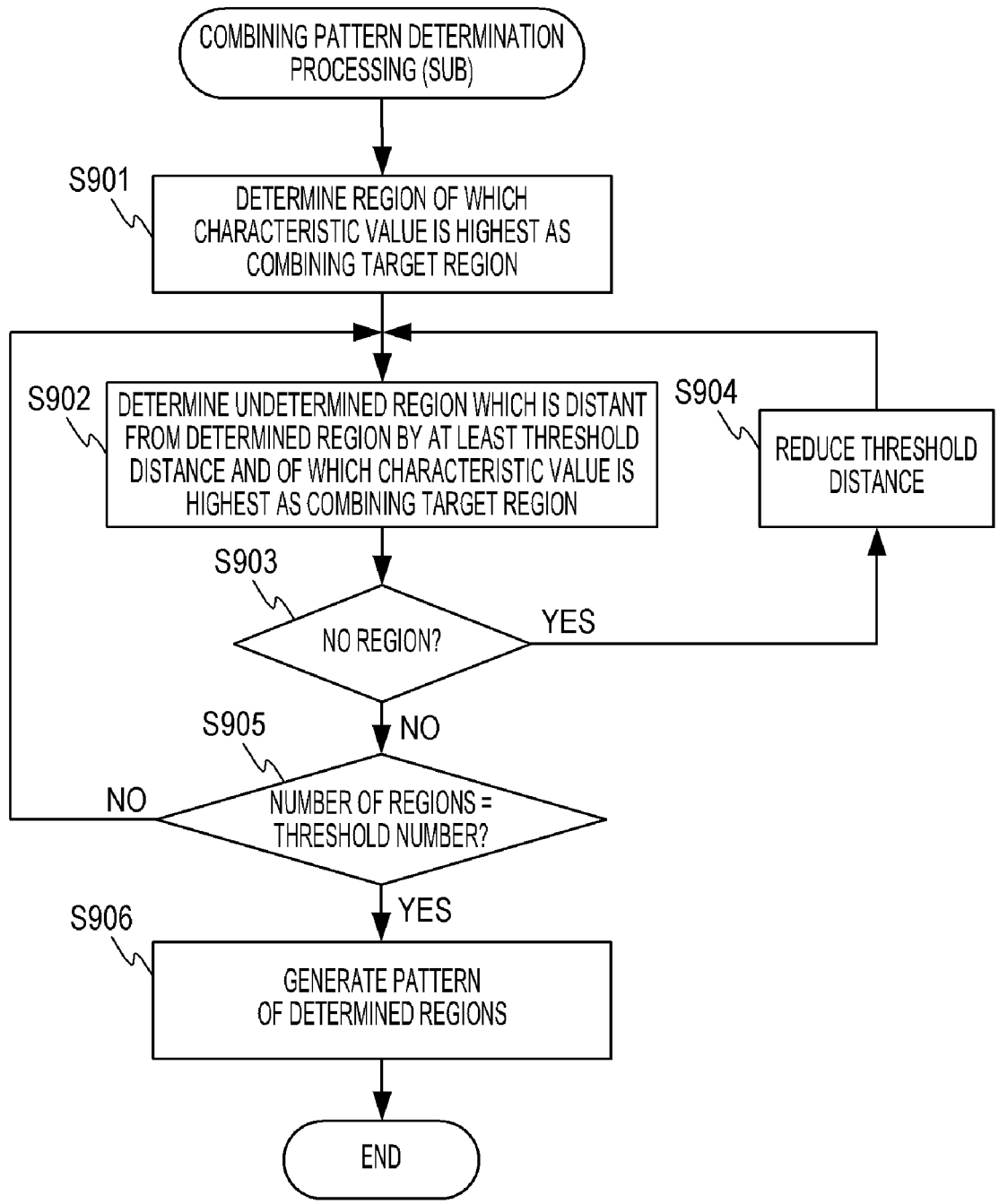
FIG. 9 is a flow chart depicting an example of a combining pattern determination processing (sub).

FIG. 9 is a flow chart depicting another example of the combining pattern determination processing (sub) which is performed in step S605 in FIG. 6. In the combining pattern determination processing (sub) in FIG. 9, a combining pattern is determined based on the characteristic value of each divided region and the distance of the divided regions.

In step S901, the combining pattern determination unit 102 determines (selects) a divided region of which characteristic value is highest (divided region of which visibility is lowest), as the combining target region, out of all the divided regions.

In step S902, the combining pattern determination unit 102 determines (selects) the divided region of which characteristic value is highest (divided region of which visibility is lowest), as the combining target region, out of undetermined regions of which distances from the determined combining target region are a threshold distance or more. As mentioned above, the undetermined region is a divided region which is not determined as a combining target region. In the case where a plurality of combining target regions exist, a combining target region is determined out of candidates, which are undetermined regions of which distances from all the existing combining target regions are the threshold distance or more. In one embodiment, the initial value of the threshold distance is the same as the above mentioned threshold distance d that is used for the combining condition, but may be different from the threshold distance d.

Depending on the sequence of determining (selecting) a combining target region, an undetermined region of which distance from the combining target region is the threshold distance or more may not exist. In step S903, the combining pattern determination unit 102 determines whether such a state occurred in step S902 (state where an undetermined region of which distance from the determined combining target region is the threshold distance or more does not exist). Processing advances to step S904 if there is no undetermined region of which distance from the determined combining target region is the threshold distance or more. Processing advances to step S905 if there is an undetermined region of which distance from the determined combining target region is the threshold distance or more, and this region was determined as the combining target region in step S902.

In step S904, the combining pattern determination unit 102 decreases the threshold distance that is used in step S902, since there is no undetermined region of which distance from the determined combining target region is the threshold distance or more, and no combining target region was determined in step S902. Then processing returns to step S902. By decreasing the threshold distance, candidates of the combining target region increases, and the combining target region can be determined in step S902. The decreasing amount of the threshold distance may be a fixed value, such as one pixel, or may be determined by a ratio of the current threshold distance (threshold distance before decreasing), such as 20%. In the case where the decreased threshold becomes 0 or less, the threshold distance may be set to 0. If the threshold distance is set to 0, all the undetermined regions become the candidates of the combining target region.

In step S905, the combining pattern determination unit 102 determines whether a number of determined combining target regions reached a threshold number. In one embodiment, the threshold number here is the same as the above mentioned threshold number n that is used for the combining condition, but may be different from the threshold number n. Processing returns to step S902 if the number of combining target regions did not reach the threshold number, and processing advances to step S906 if the number of combining target regions reached the threshold number. In other words, the processing to determine the divided region of which characteristic value is highest (divided region of which visibility is lowest) as the combining target region, out of the undetermined regions of which distance from the determined combining target region is the threshold distance or more, is repeated until the threshold number of combining target regions are determined.

In step S906, the combining pattern determination unit 102 generates the combining pattern in accordance with all the determined combining target regions.

Figure 10:
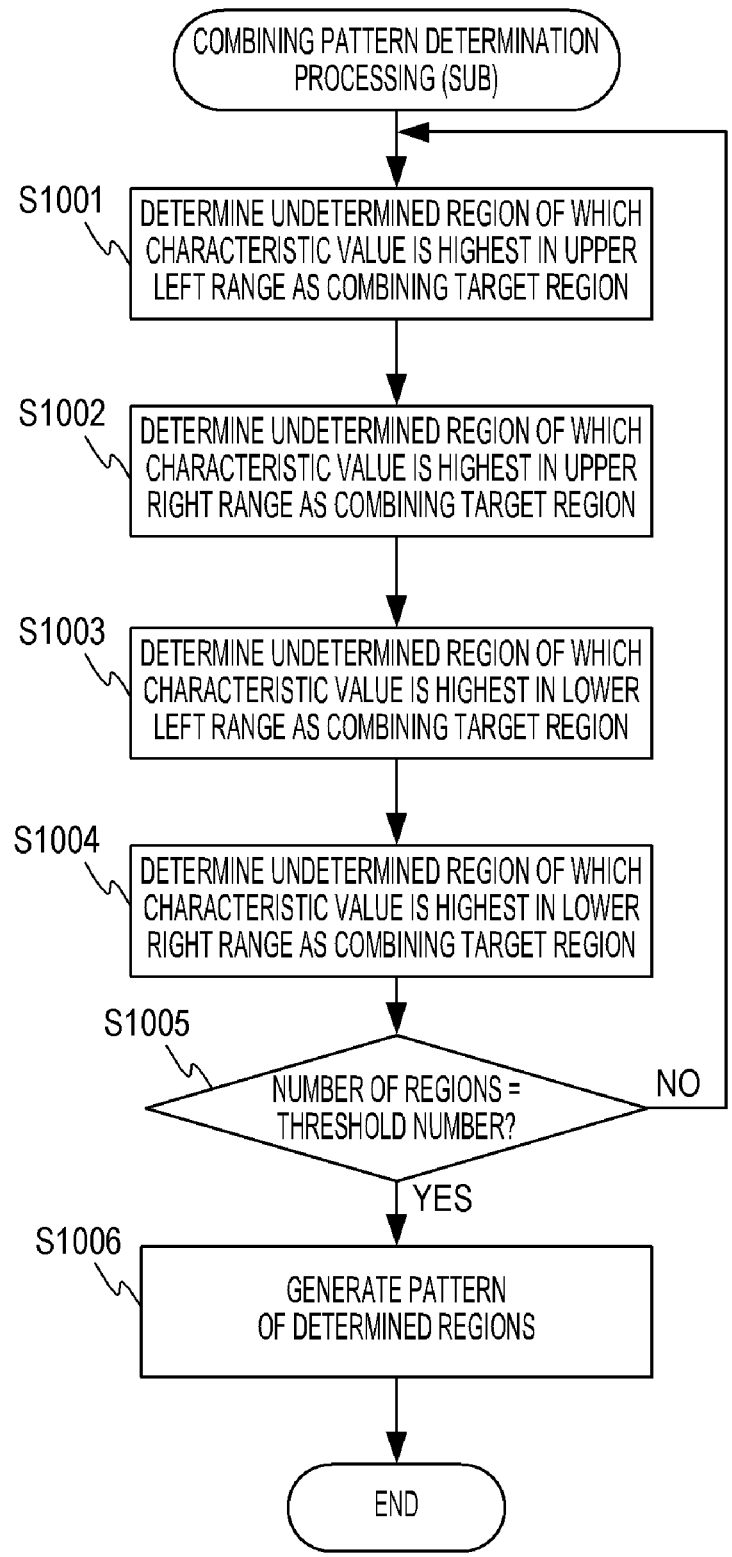
FIG. 10 is a flow chart depicting an example of a combining pattern determination processing (sub).

FIG. 10 is a flow chart depicting another example of the combining pattern determination processing (sub) which is performed in step S605 in FIG. 6. In the combining pattern determination processing (sub) in FIG. 10, a combining pattern is determined based on the characteristic value of each divided region and the position of each divided region. Specifically, a plurality of combining target regions are determined within a predetermined range from the vertex of the input image, and a combining pattern is generated in accordance with the determined plurality of combining target regions.

Figure 11:
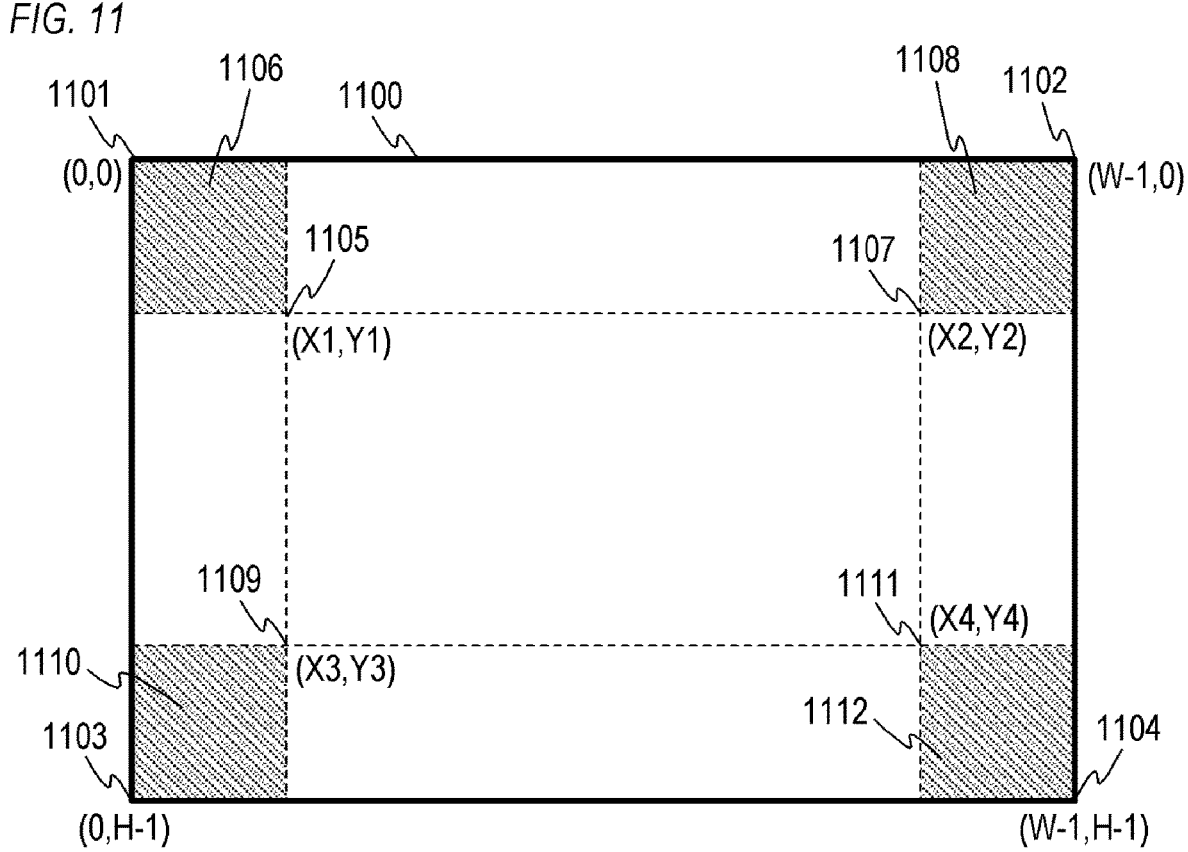
FIG. 11 is a conceptual diagram depicting an example of predetermined ranges from vertexes of an input image.

FIG. 11 is a conceptual diagram depicting an example of predetermined ranges from the vertexes of an input image. W indicates a width (a number of pixels in the horizontal direction) of an input image 1100, and H indicates a height (a number of pixels in the vertical direction) of the input image 1100. The coordinates (position in horizontal direction, position in vertical direction) of a pixel 1101 at the upper left corner of the input image 1100 are (0, 0). The coordinates of a pixel 1102 at the upper right corner of the input image 1100 are (W−1, 0). The coordinates of a pixel 1103 at the lower left corner of the input image 1100 are (0, H−1). The coordinates of a pixel 1104 at the lower right corner of the input image 1100 are (W−1, H−1).

The coordinates 1105 are coordinates (X1, Y1) to define the upper left range (predetermined range from the pixel 1101 (upper left corner; upper left vertex)) of the input image 1100. A range 1106 is the upper left range, and is a range from the coordinates (0, 0) to the coordinates (X1, Y1). The coordinates 1107 are coordinates (X2, Y2) to define the upper right range (predetermined range from the pixel 1102 (upper right corner; upper right vertex)) of the input image 1100. A range 1108 is the upper right range, and is a range from the coordinates (X2, 0) to the coordinates (W−1, Y2) (range from the coordinates (W−1, 0) to the coordinates (X2, Y2)). The coordinates 1109 are coordinates (X3, Y3) to define the lower left range (predetermined range from the pixel 1103 (lower left corner; lower left vertex)) of the input image 1100. A range 1110 is the lower left range, and is a range from the coordinates (0, Y3) to the coordinates (X3, H−1) (range from the coordinates (0, H−1) to the coordinates (X3, Y3)). The coordinates 1111 are coordinates (X4, Y4) to define the lower right range (predetermined range from the pixel 1104 (lower right corner; lower right vertex)) of the input image 1100. A range 1112 is the lower right range, and is a range from the coordinates (X4, Y4) to the coordinates (W−1, H−1).

In the following, an example of sequentially switching the predetermined range to determine the combining target region among the four predetermined ranges illustrated in FIG. 11 will be described, but a number of the predetermined ranges to determine the combining target region is not especially limited, and may be two or three, for example. Further, the combining target region may be determined only from one predetermined range, without switching the predetermined range to determine the combining target region.

FIG. 10 will now be described. In step S1001, the combining pattern determination unit 102 determines (selects) a divided region of which characteristic value is highest (divided region of which visibility is lowest), as the combining target region, out of the undetermined regions (divided regions which are not determined as the combining target regions) in the upper left range of the input image.

In step S1002, the combining pattern determination unit 102 determines (selects) a divided region of which characteristic value is highest (divided region of which visibility is lowest), as the combining target region, out of the undetermined regions in the upper right range of the input image.

In step S1003, the combining pattern determination unit 102 determines (selects) a divided region of which characteristic value is highest (divided region of which visibility is lowest), as the combining target region, out of the undetermined regions in the lower left range of the input image.

In step S1004, the combining pattern determination unit 102 determines (selects) a divided region of which characteristic value is highest (divided region of which visibility is lowest), as the combining target region, out of the undetermined regions in the lower right range of the input image.

In step S1005, the combining pattern determination unit 102 determines whether a number of determined combining target regions reached a threshold number. In one embodiment, the threshold number here is the same as the above mentioned threshold number n that is used for the combining condition, but may be different from the threshold number n. Processing returns to step S1001 if the number of combining target regions did not reach the threshold number, and processing advances to S1006 if the number of combining target regions reached the threshold number. In other words, the processing in steps S1001 to S1004 is repeated until the threshold number or more of combining target regions are determined. In the case of repeating the processing in steps S1001 to S1004, undetermined regions of which distances from the determined combining target region are the threshold distance or more may be determined as candidates, from which a combining target region is determined, just like step S902 in FIG. 9.

In step S1006, the combining pattern determination unit 102 generates a combining pattern in accordance with all the determined combining target regions.

The above mentioned embodiment (including modifications) is merely an example, and configurations implemented by modifying and changing the above mentioned configurations within the scope of the essence of the disclosure are also included in the disclosure. Configurations implemented by appropriately combining the above mentioned configurations are also included in the disclosure.

As mentioned above, in the case where the combining information (pattern image) to detect the shape, image quality or the like of the image is combined with a projection image and projected onto the projection surface, the projection image can be adjusted based on the image acquired by capturing the projection image using a camera (imaging apparatus), which is not illustrated.

In FIG. 1, the projection apparatus 100 includes an image processing unit 107 that corrects a shape of a projection image, and a communication interface 108 that connects with the imaging apparatus. The imaging apparatus connected to the projection apparatus 100 captures a projection image, in which a pattern image is combined, and acquires the captured image. The projection apparatus 100 acquires the captured image from the imaging apparatus via the communication interface 108.

The image processing unit 107 is a processor constituted of one or more CPUs, for example. The image processing unit 107 may include an electronic circuit that executes one or more of the following steps.

The image processing unit 107 detects a portion corresponding to the combined pattern image from the captured image. In a case where the pattern image is a dot pattern, the image processing unit 107 acquires the correspondence between the positions (coordinates) of the dots in the captured image and positions (coordinates) of the dots in the projection image. Here it is assumed that a position of a dot in the projection image is coordinates (x, y) of a dot in the coordinate system (X, Y) on the display panel included in the projection unit 106. It is also assumed that a position of a dot in the captured image is coordinates (m, n) of a dot in the coordinate system (M, N) of the captured image. Then the image processing unit 107 generates a function F which can convert the coordinates (x, y) of the dot in the captured image into the coordinates (m, n) of the dot in the projection image.

Based on the function F, the image processing unit 107 generates parameters to correct the shape, so that the projection image is displayed having a desired shape (a rectangle in many cases) on the projection surface. By using the generated parameters, the image processing unit 107 executes the shape correction on the projection image. The shape correction is called keystone correction, geometric shape correction, or the like. The projection image after the shape correction is outputted to the projection unit 106, and is projected onto the projection surface.

The imaging apparatus may be disposed inside the projection apparatus 100. The processing to acquire the captured image from the imaging apparatus and generate the parameters of the shape correction may be executed by a processing device that can communicate with the imaging apparatus and the projection apparatus. The processing device is a personal computer, for example.

According to the present disclosure, a graphic can be projected in a state of low visibility with certainty.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-065890, filed on Apr. 1, 2020, which is hereby incorporated by reference herein in its entirety.

What is claimed is:

1. A projection apparatus comprising:
   at least one processor; and
   at least one memory coupled to the at least one processor, the memory having instructions that, when executed by the processor, performs function as:
   an acquisition unit configured to acquire a characteristic value of each of partial regions of an input image;
   a determination unit configured to determine target regions for which a graphic is displayed, out of the partial regions, based on the acquired characteristic values and a predetermined condition; and
   a control unit configured to control so that the graphic is displayed in the target regions of the input image,
   wherein the determination unit determines the target regions so that a user is not able to visually recognize the graphic.

2. The projection apparatus according to claim 1, wherein the instructions further performs function as a combining unit configured to combine the graphic with each of the determined target regions, and
   the control unit controls so that an image after combining by the combining unit is projected.

3. The projection apparatus according to claim 2, wherein magnitude of the characteristic value corresponds to visibility of the graphic in the image after the combining.

4. The projection apparatus according to claim 3, wherein the visibility is lower as the characteristic value is higher.

5. The projection apparatus according to claim 3, wherein the characteristic value is based on at least one of a motion amount of an image in a corresponding partial region, a spatial brightness change amount in the corresponding partial region, and a brightness value of the corresponding partial region.

6. The projection apparatus according to claim 3, wherein the predetermined condition includes that a number of partial regions each of which visibility is a threshold or less, is a threshold number or more.

7. The projection apparatus according to claim 3, wherein the predetermined condition includes that a distance of the partial regions each of which visibility is a threshold or less, is a threshold distance or more.

8. The projection apparatus according to claim 3, wherein the determination unit determines, as the target regions, a threshold number of partial regions in order from the partial region having lower visibility based on the characteristic values.

9. The projection apparatus according to claim 3, wherein the determination unit:
   determines a partial region having lowest visibility as the target region, and
   repeats processing to determine, as the target region, a partial region having lowest visibility, out of partial regions each of which distance from the determined target region is a threshold distance or more and which are not yet determined as the target region, until a threshold number of target regions are determined, based on the characteristic values.

10. The projection apparatus according to claim 9, wherein in a case where there is no partial region of which distance from the determined target region is the threshold distance or more and which is not yet determined as the target region, the determination unit reduces the threshold distance and performs the processing.

11. The projection apparatus according to claim 3, wherein the determination unit repeats processing to determine, as the target region, a partial region having lowest visibility, out of partial regions which are within a predetermined range from a vertex of the input image and which are not yet determined as the target region, until a threshold number of target regions are determined, based on the characteristic values.

12. The projection apparatus according to claim 11, wherein the determination unit sequentially switches the predetermined range to determine the target region, among ranges from vertexes of the input image.

13. The projection apparatus according to claim 3, wherein in a case where two or more partial regions each of which visibility is a predetermined threshold or less, out of the partial regions, satisfy the predetermined condition, the determination unit determines the two or more partial regions as the target regions.

14. The projection apparatus according to claim 1, wherein the graphic is a pattern image for adjusting a shape and image quality of an image to be projected by the projection apparatus, and is to be detected from a captured image obtained by capturing an image projected by the projection apparatus.

15. A control method of a projection apparatus, comprising:
   acquiring a characteristic value of each of partial regions of an input image;
   determining target regions for which a graphic is displayed, out of the partial regions, based on the acquired characteristic values and a predetermined condition; and
   controlling so that the graphic is displayed in the target regions of the input image,
   wherein the target regions are determined so that a user is not able to visually recognize the graphic.

16. The control method according to claim 15, further comprising:
   combining the graphic with each of the determined target regions; and
   controlling so that an image, after the combining, is projected.

17. The control method according to claim 15, wherein the graphic is a pattern image for adjusting a shape and image quality of an image to be projected, and is to be detected from a captured image obtained by capturing a projected image.

18. A non-transitory computer readable medium that stores a program, wherein the program causes a computer to execute a control method of a projection apparatus, the control method comprising:
   acquiring a characteristic value of each of partial regions of an input image;
   determining target regions for which a graphic is displayed, out of the partial regions, based on the acquired characteristic values and a predetermined condition; and
   controlling so that the graphic is displayed in the target regions of the input image,
   wherein the target regions are determined so that a user is not able to visually recognize the graphic.

19. The non-transitory computer readable medium according to claim 18, wherein the control method further comprises:
   combining the graphic with each of the determined target regions; and
   controlling so that an image, after the combining, is projected.

20. The non-transitory computer readable medium according to claim 18, wherein the graphic is a pattern image for adjusting a shape and image quality of an image to be projected, and is to be detected from a captured image obtained by capturing an image projected.

* * * * *